Figure 1:
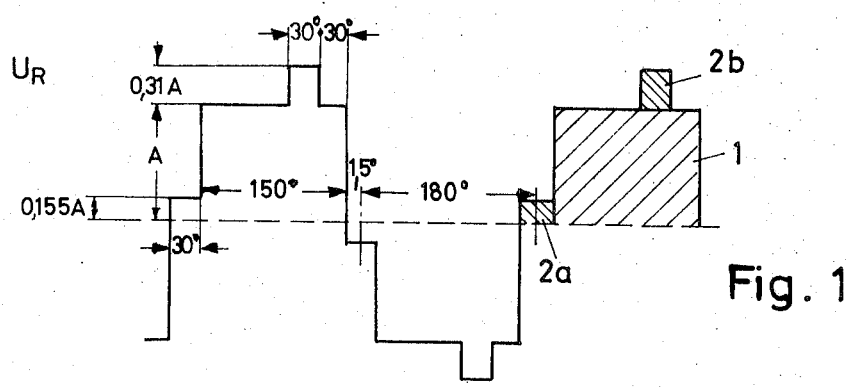

United States Patent [19]
Jensen

[11] 3,838,331
[45] Sept. 24, 1974

[54] THREE-PHASE INVERTER
[75] Inventor: Arne Jensen, Sonderborg, Denmark
[73] Assignee: Danfoss A/S, Nordborg, Denmark
[22] Filed: Feb. 2, 1973
[21] Appl. No.: 329,104

[30] Foreign Application Priority Data
Feb. 19, 1972  Germany............................ 2207811

[52] U.S. Cl.......... 321/9 R, 321/27 MS, 321/DIG. 1
[51] Int. Cl.......................... H02m 1/12, H02m 7/52
[58] Field of Search....... 321/5, 9 R, 27 MS, DIG. 1

[56]              References Cited
              UNITED STATES PATENTS
3,346,798   10/1967   Dinger............................ 321/27 MS
3,491,282   1/1970    Heinrich et al. .................... 321/9 R
3,521,143   7/1970    Anderson et al. ...................... 321/5
3,638,094   1/1972    VeNard........................... 321/27 MS
3,657,633   4/1972    Urish............................. 321/27 MS Primary Examiner—William H. Beha, Jr.

[57]              ABSTRACT

A three-phase inverter for producing a stepped voltage approximating to a sinusoidal form, and largely free of odd harmonics, wherein, for the purpose of producing each phase voltage a basic and two additional rectangular impulses are summed, the basic impulse being shortened in relation to a half-wave and occupying substantially the entire amplitude-time area of the phase voltage, and the additional impulses having a considerably smaller amplitude and shorter duration than the basic impulse. One of the additional impulses procedes and the other is superimposed on a basic impulse of the same polarity.

9 Claims, 11 Drawing Figures

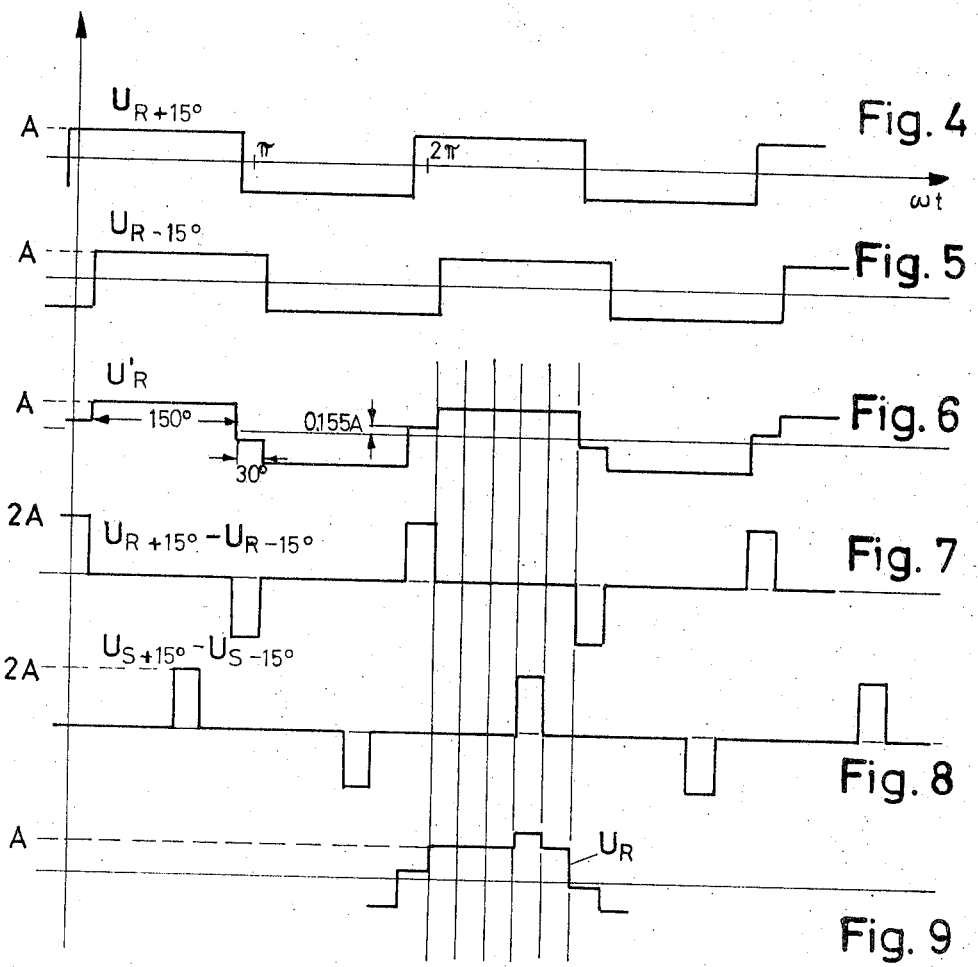

THREE-PHASE INVERTER

The invention relates to a three-phase inverter for providing a stepped line-to-line voltage approximating to the sinusoidal form, and wherein, for the purpose of producing the phase voltage, square-wave impulses, namely a basic and two additional impulses, are summated, the basic impulse being shortened in relation to a half-wave and occupying substantially the entire amplitude-time area of the phase voltage, and the additional pulses having a considerably smaller amplitude and shorter duration than the basic impulse.

A three-phase inverter of this kind is known in which two consecutive additional impulses of like amplitude and disposed symmetrically of the basic impulse are superposed upon the basic impulse. The basic impulse is produced by formation of the mean value of two wave-trains which consist of 180° square-wave impulses offset from each other to the extent of the amount of the shortening. The wave-trains are supplied by two inverter systems which operate at phase positions offset from each other to the extent of 30 electrical degrees. The mean value is formed in the primary windings of a three-phase transformer, these windings being provided with mid-point tappings. Two secondary windings for providing the additional impulses are associated with each primary winding. Summation is achieved by connecting each mid-point tapping, arranged in series with a secondary winding of one of the adjacent phases and a secondary winding of the other adjacent phase, to the associated output terminal.

Each superposition of the two square-wave impulses calls for a certain degree of complication in the circuitry. This is very small in the case of the known inverter, since only two small additional impulses require to be superposed upon the basic impulse.

The object of the present invention is to provice a three-phase inverter of the initially described kind in which the system of superposing square-wave impulses is still further simplified.

According to the invention, this object is achieved by providing the first additional impulse between consecutive basic impulses of different sign, and by superposing the second additional impulse on the basic impulse on that side of the line of symmetry of the basic impulse opposite the first additional impulse.

This system results in a phase voltage that deviates only minimally from a pure square-wave impulse. Only a single additional impulse requires to be superposed upon this square-wave inpulse. The other additional impulse is interposed between two basic impulses, and therefore requires no superposition circuitry. Despite this completely asymmetrical form of the phase voltage, a line-to-line voltage approximate to the sinusoidal form is obtained by comining the phase voltages.

By combining the phase voltages the third harmonic and its multiples are eliminated. Moreover, the shortening of the duration of the basic impulse, and the two additional impulses can be so selected that further harmonics can be entirely or partially suppressed. Furthermore, in the case of certain circuits there is offered the advantage that even if the additional impulses fail, it is still possible to continue to drive the connected machine or other unit by means of the basic impulse virtually without change.

A particularly simple circuit is obtained if a wave-train, consisting of the basic impulse and the first additional impulse, is passed to the output terminal without being transformed, and the second additional impulse is simply superposed thereon by way of a transformer. This results in a simple and inexpensive circuit, in relatively small transformers, and in low copper losses.

In a preferred arrangement, the basic impulse is obtained, at an impedor having a mid-point tapping, by forming the mean value of two wave-trains which consist of 180° square-wave impulses offset from each other to the extent of the amount of the shortening, and the mid-point tapping is shifted slightly from the true mid-point position for the purpose of producing the first additional impulse. The "weighed" mean value can therefore be picked up at the mid-point tapping. In this arrangement, the first additional impulse can be obtained by using the same means as those employed for forming the shortened basic impulse.

In particular the impedors with offset mid-point tappings can be formed by the primary windings of a three-phase transformer used for superposing the second additional impulse.

An optimum form of curve for the phase voltage is obtained if the basic impulse is shortened at each edge by 15° as compared with a full half-wave, and if the first additional impulse has a duration of 30° and the second additional impulse has a duration of 30° and its distance from one edge is also 30°. Preferably, the amplitude of the first additional impulse should be 15.5 percent and that of the second additional impulse 31 percent of the amplitude of the basic impulse. If these values are used, not only is the third harmonic suppressed as a result of combining of the phase voltages but, with the aid of the additional impulses, the fifth and seventh harmonics are completely eliminated. The same also applies in the case of the $n^{th}$ harmonic, as far as $n = (5 + p.12), (7 + p.12)$ and $p.3$, wherein any positive integer can be inserted for $p$.

The required values of the first additional impulse can be obtained very simply by displacing the mid-point tapping from the true mid-way position to the extent of 7.8 percent.

For the purpose of forming the second additional impulse and of superposing it at the correct moment, the transformer preferably has a winding ratio of 1 : 0.155, and the mid-way tapping of each primary winding is connected to the associated output terminal by way of a series-connected secondary winding of the transformer of an adjacent phase.

Figure 2:
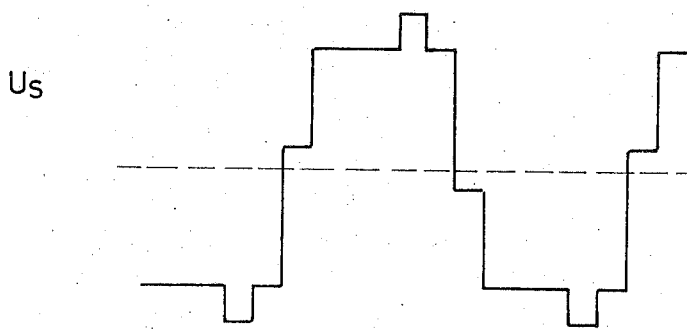
Figure 3:
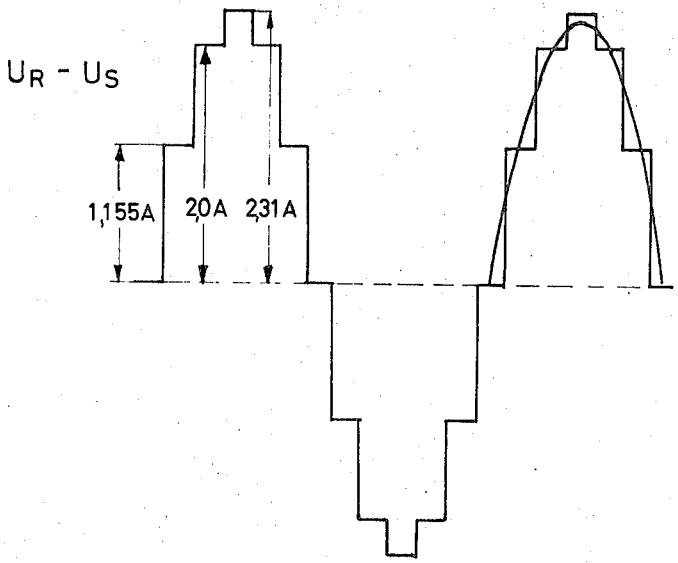
Figure 10:
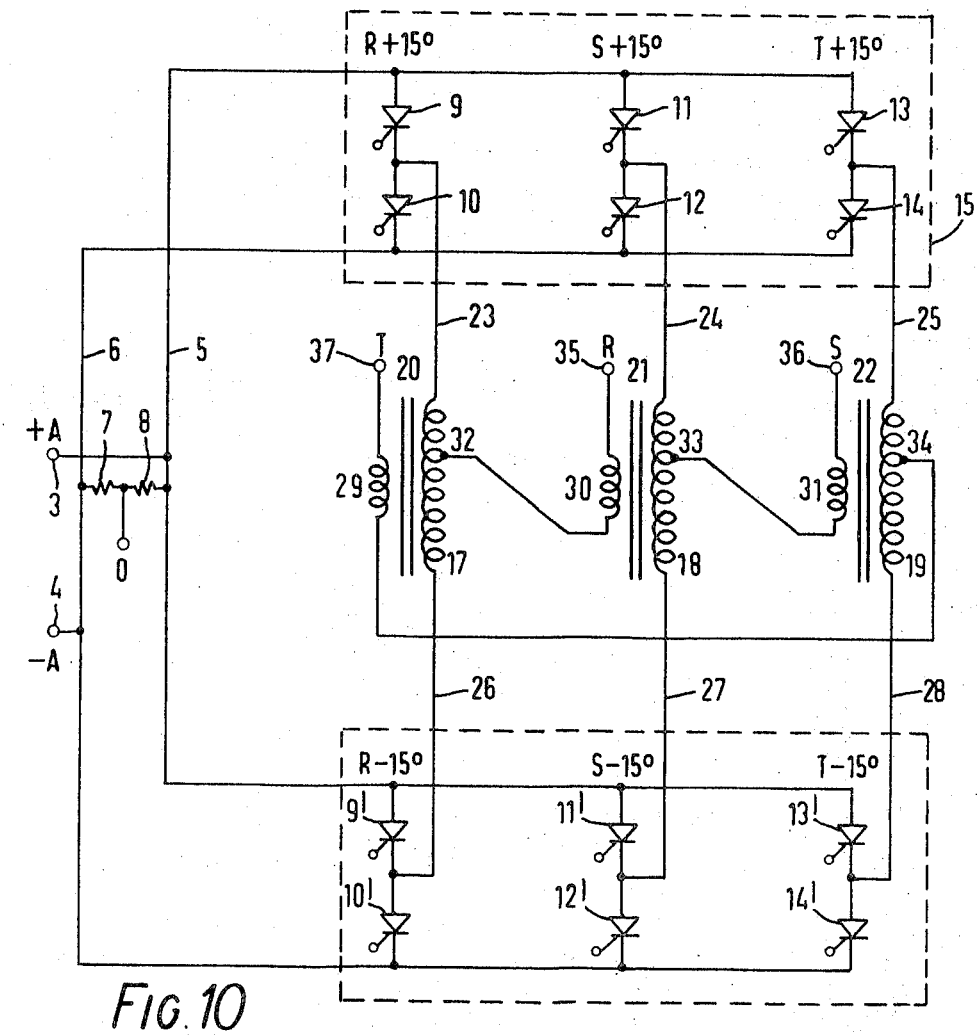
Figure 11:
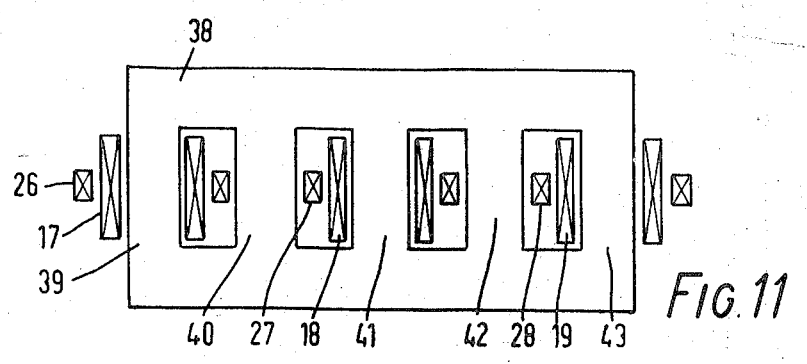

The invention will now be described in greater detail by reference to an embodiment illustrated in the drawing, in which:

FIG. 1 shows a form of phase voltage that may be used in accordance with the invention, FIG. 2 shows a phase voltage shifted through 120° from that shown in FIG. 1, FIG. 3 shows the output voltage at the terminals of the inverter that results from combining the two above-mentioned phase voltages, FIG. 4 shows a first wave-train consisting of 180° square-wave impulses, FIG. 5 is a similar wave-train shifted through 30°, FIG. 6 shows the "weighed" mean value of the two above-mentioned wave-trains that can be picked up when the mid-point tapping is displaced, FIG. 7 illustrates the difference between the two above-mentioned wave-trains, FIG. 8 illustrates the difference between two wave-trains from a second phase, FIG. 9 shows a phase voltage made up therefrom, FIG. 10 shows one form of circuit diagram in accordance with the invention, and FIG. 11 illustrates a transformer that may be used in accordance with the invention.

FIG. 1 illustrates the phase voltage $U_R$. Herein, a square-wave basic impulse 1 is supplemented by two square-wave additional impulses 2a and 2b, one in the positive and the other in the negative zone. The basic impulse has an amplitude A and a duration of 150°, i.e. it is shortened from 180° by 15° at the two edges. The first additional impulse 2a has an amplitude of 0.155 A and a duration of 30°. It occurs between consecutive basic impulses of different sign. The second additional impulse 2b has an amplitude of 0.31 A and a duration of 30°; it occurs at a distance of 30° from that edge of the basic impulse 1 remote from the first additional impulse 2a.

If this voltage is combined with the voltage $U_S$ of another phase shifted through 120°, the output voltage $U_R - U_S$, shown in FIG. 3, occurs across each two output terminals. The stages of this output voltage which follow each other at intervals of 30° have the values 1.155 A, 2.0 A, 2.31 A, 2.0 A and 1.155 A.

It will be seen that this output voltage has a form very closely matched to the sinusoidal form, although the phase voltages consist only of square-wave impulses that have been modified very slightly. The phase voltages have an extremely high third-harmonic constituent which is suppressed by combining them. By shortening the basic impulse 1 and applying the additional impulses 2 having the stated values, the fifth and seventh harmonics are also completely eliminated. Since, as previously mentioned, further harmonics are also eliminated by these means, the output voltage is free of the third, fifth, seventh, ninth, 15, 17, 19, 21, 27, 29, 31, 33, etc. harmonics.

The phase voltage of FIG. 1 can be produced in the following manner: from a first wave-train $U_{(R + 15)}$ consisting of 180° square-wave impulses and a second similar wave-train $U_{(R - 15)}$, which is displaced from $U_{(R + 15)}$ by 30° (FIGS. 4 and 5), there is formed a "weighted" mean value $U'_R$, in which the wave-train $U_{(R + 15)}$ has greater weight than the wave-train $U_{(R - 15)}$. Consequently not only is there a basic impulse 1 of a duration of 150° spaced 30° from the following basic impulse formed, but also a first additional impulse 2a which in the present case leads each basic impulse (FIG. 6).

At the same time the difference $U_{(R + 15)} - U_{(R - 15)}$ (FIG. 7) between the wave-trains of FIGS. 4 and 5 is obtained; similarly, the voltage differences $U_{(S + 15)} - U_{(S - 15)}$ (FIG. 8), and $U_{(T + 15)} - U_{(T - 15)}$, are also produced in the other phases. This difference resulsts in impulses having a duration of 30°. For example the impulse $U_{(S + 15)} - U_{(S - 15)}$ occurs precisely at that point in time corresponding to the second additional impulse in the phase R. The second additional impulse 2b required in the phase R can therefore be derived, by way of a suitable matching element, from the voltage difference obtained in phase S. The phase voltage $U_R$ (FIG. 9) is obtained in this way.

The inverter of the invention may have the circuit illustrated in FIG. 10, for example.

A D.C. voltage + A and − A is applied respectively to the input terminals 3 and 4 of the inverter. The terminal 3 is connected to a lead 5 and the terminal 4 to a lead 6. With the aid of a voltage divider consisting of the resistors 7 and 8, it is possible to determine the reference zero point of the system. Connected to the leads are series arrangements each consisting of two circuit elements which are here shown as controllable rectifiers 9 − 14 and 9' − 14', but which may be of any other required form, e.g., they may take the form of transistors. The rectifiers 9, 10 and 9', 10' correspond to the phase R, the rectifiers 11, 12 and 11', 12' to the phase S, and the rectifiers 13, 14 and 13', 14' to phase T. In this arrangement control is such that the first-mentioned rectifiers lead a particular reference time by 15° and the others lag behind it by 15°. The arrangement can therefore be treated as two three-phase inverter systems 15 and 16, operating at a phase-shift of 30°, A primary winding 17, 18, or 19 of a transformer 20, 21, or 22 respectively, is associated with each phase. The ends of the primary winding are connected, through leads 23, 24 and 25, and 26, 27 and 28 respectively, to each of the mid-way points between the controllable rectifiers of the same phase. Each transformer has a secondary winding 29, 30 or 31 and a "midpoint" tapping 32, 33 or 34 which is upwardly displaced to the extent of 7.8 %. The mid-point tapping 32 is connected through the secondary winding 30 to the output terminal 35 of phase R. The mid-point tapping 33 is connected through the secondary winding 31 to the output terminal 36 of phase S. The mid-point tapping 34 is connected through the secondary winding 29 to the output terminal 37 of the phase T.

This circuit operates in the following manner. Each rectifier is conductive for 180°. Thus, for phase R, the voltage $U_{(R + 15)}$ (FIG. 4) is obtained in the lead 23, and the voltage $U_{(R - 15)}$ (FIG. 5) in the lead 26. The weighed mean value of these two voltages, i.e., $U'_R$, can therefore be picked up at the mid-point tapping 32 of the primary winding 15. Furthermore, between the ends of the primary windings there is created the difference between the two voltages supplied, as illustrated for phases R and S in FIGS. 7 and 8. This difference is suitably stepped down and passed to the secondary windings and is consequently added to the mean-value voltages. Consequently a phase voltage U, as illustrated in FIG. 9, is obtained at the output terminals 35, 36 and 37.

This mode of operation results in the basic impulse 1 and the first additional impulse 2a, which correspond to the mean value U' (FIG. 6), being passed without any transformation from the input terminals 3 and 4 to the machine or other unit connected to the output terminals 35, 36 and 37. Only a small proportion of the power, which corresponds to the second additional impulses 2b, requires to be fed to the circuit of the machine or other unit by way of the secondary windings 29, 30 and 31.

The inverter circuit is shown only diagrammatically. The diagram does not include the control means, the quenching means, the free-running diodes, etc. Any suitable known principle can be used for these purposes. A specific and detailed form of such an inverter circuit is completely disclosed in U.S. Pat. No. 3,559,034, Jan. 26, 1971, titled "Inverted Converter Having Common Quenching Means For All Controllable Rectifiers" of which the applicant herein is a copatentee with Tom Kastrup Petersen.

FIG. 11 shows a preferred arrangement for mounting the three transformers on one iron core 38. The core has a total of five limbs 39 - 43, of which only the limbs 39, 41 and 43 are provided for each of the transformers 20 - 22 and carry the windings 17 - 19 and 29 - 31, whereas the limbs 40 and 42 are not wound. Consequently, the magnetic circuit of each individual transformer can be combined by way of one of the unwound limbs although the two other transformers are virtually short-circuited as regards alternating current.

I claim:

1. A three-phase inverter for producing a stepped output voltage approximating to a sinusoidal form, the inverter comprising for each phase voltage: first means to produce a first voltage comprising a series of basic rectangular voltage impulses of alternating polarity, each said basic impulse having a duration of less than 180° and occupying substantially all the amplitude-time area of the respective phase voltage, and a series of first additional rectangular voltage impulses of alternating polarity, each said first additional voltage impulse having a duration substantially less than 180° and equal to 180° minus the duration of a said basic voltage impulse and preceding a said basic voltage impulse of the same plarity; second means to produce a series of second additional rectangular voltage impulses of alternating polarity, each said second additional voltage impulse having a duration substantially less than 180° and a time position on the opposite side of the center of a said basic impulse of the same polarity relative to said first additional impulse preceding said basic impulse; and summation means to sum said first voltage and said series of second additional rectangular voltage impulses to produce said phase voltage.

2. An inverter according to claim 1 wherein said summation means comprises a transformer having an output terminal from which in use said phase voltage is derived, and wherein said first voltage is supplied to said output terminal without transformation by said transformer.

3. An inverter according to claim 1 wherein said first means comprises means to produce two similar wavetrains which consist of 180° square-wave impulses and which are offset in phase relative to one another by 180° minus the duration of a said basic impulse, an impendance to which in use said wave-trains are supplied, and a tapping on said impendance and displaced from the mid-point thereof for the purpose of producing said first additional impulses from which tapping said first voltage is derived.

4. An inverter according to claim 3 wherein said tapping is 7.8% from said mid-point.

5. An inverter according to claim 3 comprising for each phase a transformer which forms said summation means, said transformer having a primary winding which forms said impendance and a secondary winding to which said output terminal is connected.

6. An inverter according to claim 5 wherein said transformers each have a primary to secondary winding ratio of 1 to 0.155, and each said tapping is connected to a said output terminal by a path comprising said secondary winding of an adjacent phase.

7. An inverter according to claim 6 wherein said windings of said transformers are all wound on a common iron core.

8. An inverter according to claim 1 wherein each said basic impulse has a duration of 150°, and each said first additional impulse has a duration of 30 , and each said second additional impulse has a duration of 30° and its distance from the trailing edge of the associated said basic impulse is also 30°.

9. An inverter according to claim 1 wherein the amplitude of each said first additional impulse is 15.5 percent and that of each said second additional impulse 31 percent of the amplitude of each said basic impulse.

* * * * *